United States Patent
Kelley

[19]

[11] Patent Number: 5,942,330
[45] Date of Patent: Aug. 24, 1999

[54] ADHESIVE COMPOSITIONS AND METHODS AND ARTICLES OF MANUFACTURE COMPRISING SAME

[75] Inventor: Ronald J. Kelley, Framingham, Mass.

[73] Assignee: Bostik, Incorporated, Middleton, Mass.

[21] Appl. No.: 08/867,054

[22] Filed: Jun. 2, 1997

Related U.S. Application Data

[63] Continuation of application No. 08/245,868, May 19, 1994, abandoned.

[51] Int. Cl.$^6$ ..................................................... B32B 27/40
[52] U.S. Cl. ..................... 428/423.1; 428/343; 428/346; 428/355; 428/424.6; 428/906
[58] Field of Search ..................... 428/343, 346, 428/355, 423.1, 424.6, 906

[56] References Cited

U.S. PATENT DOCUMENTS

| | | | |
|---|---|---|---|
| 4,400,497 | 8/1983 | Blum et al. | 528/45 |
| 4,525,570 | 6/1985 | Blum et al. | 528/75 |
| 4,543,144 | 9/1985 | Thoma et al. | 156/230 |
| 4,543,393 | 9/1985 | Blum et al. | 525/124 |
| 4,546,165 | 10/1985 | Grogler et al. | 528/53 |
| 4,581,432 | 4/1986 | Blum et al. | 528/45 |
| 4,596,835 | 6/1986 | Werner et al. | 521/122 |
| 4,788,091 | 11/1988 | Rossitto et al. | 523/40 |
| 4,849,262 | 7/1989 | Uhl et al. | 427/288 |
| 4,888,124 | 12/1989 | Blum et al. | 252/182.2 |

OTHER PUBLICATIONS

Product Data Sheet for Desmodur BL 3175A, Sep. 1988.
Product Data Sheet for Desmodur LS–2800, Jul. 1985.

*Primary Examiner*—D. S. Nakarani
*Attorney, Agent, or Firm*—David G. Conlin; Peter F. Corless; Dike,Bronstein, Roberts & Cushman, LLP

[57] ABSTRACT

The present invention provides novel curing adhesive film composition useful to produce structural materials, such as decorative panels for aircraft interiors, and methods and articles of manufacture that comprise such compositions. A preferred adhesive film composition of the invention comprises a reactive polyurethane resin and an isocyanate that comprises a thermally labile blocking group wherein the isocyanate can be activated by exposure of a coating layer of the composition to a temperature of about 340° F. for about one second or less.

13 Claims, 1 Drawing Sheet

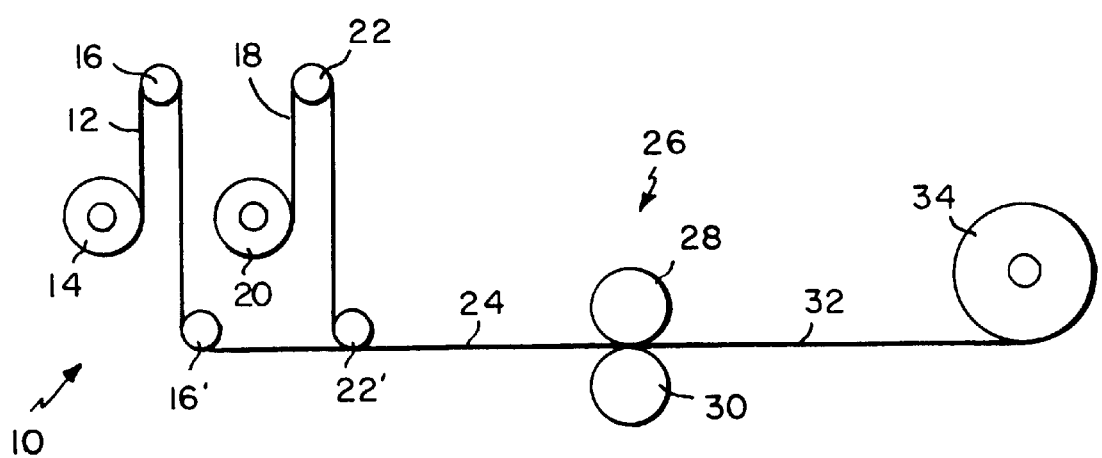

ADHESIVE COMPOSITIONS AND METHODS AND ARTICLES OF MANUFACTURE COMPRISING SAME

This is a continuation of application Ser. No. 08/245,868 filed on May 19, 1996, now abandoned.

BACKGROUND OF THE INVENTION

The present invention relates to novel curing adhesive films useful to produce structural materials, particularly for making laminated panels, e.g., for panels useful for aircraft interiors, truck siding, or for laminates useful in printed or flexible circuit boards, or for a wide variety of structural uses. The invention is particularly useful in the manufacture of decorative laminated structural panels, such as those used in aircraft, boat, mobile home or other interiors. The inventions also comprises novel methods and articles of manufacture that utilize or comprise such compositions.

Structural laminates are well known in many different areas. For example, decorative laminates are integrally or screen printed materials commonly employed in the fabrication of commercial aircraft interiors. Such decorative laminates are typically applied to many interior surfaces of passenger aircraft for purposes of decoration. These materials have been produced by lamination of a curing adhesive film and a structural layer, typically a polyvinyl fluoride film such as Tedlar®, available from E. I. DuPont de Nemours & Co. The laminate is then embossed to provide a decorative pattern. The adhesive film adheres to the Tedlar or other structural layer, and can also operate as an embossment composition, to hold the embossment in the structure, so that the laminated film retains its decorative embossed pattern while it is being further handled or manufactured, and when in place. Typically the Tedlar/adhesive structure is then adhered, through a further adhesive system, to panels, films, frames, struts, or other structural parts. The adhesive film not only preserves the texture imparted to the embossed film by the embossing or thermoforming operation, but preferably also can provide flame retardant properties to the formed laminate article.

Other structures are also known for producing structural laminates.

For example, "Double" decorative laminates are also used in aircraft interiors and are formed by casting a curing adhesive film onto a support film such as Tedlar and then placing another support film layer over the adhesive layer. The three layer stack of materials may then be laminated and embossed, with the embossed pattern primarily showing on one side of the resulting laminate. The embossed structure can then be adhered to a substrate, e.g., structural members such as ceiling or wall panels. The double layer of protective film guards against wear and tear from areas which typically receive substantial use.

Such structures and processes have suffered from a number of problems. For example, structural films such as Tedlar although flame treated to increase its surface adherability, are notoriously difficult to adhere to. Further, in order to fix the embossing in the structure in a way which would not be adversely effected by further processing steps, even where such processing is conducted at elevated temperatures, it is necessary to use an adhesive system which is thermosetting under conditions of use, i.e., which cure to form a film which holds the embossing, and which will not deform, distort or delaminate under elevated temperatures in further processing. For example, where the embossed material must then be attached to formed panels, e.g. using a vacuforming process, thermoplastic embossing films, or thermosetting embossing films which have not been cured, will lose the embossing pattern when subjected to vacuforming conditions.

See, e.g., U.S. Pat. No. 4,788,091 to Rossitto et al., which is incorporated herein by reference. As pointed out in that patent, another problem necessary to deal with in aircraft interiors is flame retardancy. In order to respond to that problem, the adhesive has to be able to accommodate whatever flame retardant system is utilized.

The laminating adhesive layer in the Rossitto patent was a material which required high cure temperatures, and extensive time at cure temperature in order to hold the embossing and adhere the adhesive to the structural (e.g. Tedlar) film. Other materials previously used, such as polyesters and polyurethanes, similarly suffered from high cure temperatures and times necessary to make the ultimate structure.

The high temperatures and dwell times required by previous systems such as that of Rossitto have necessitated slow, tedious and costly manufacturing processes in making the embossed laminates. Typically, a "sandwich" of materials is prepared in a stack and placed within a heated embossing press which applies pressure and temperature to the stationary stack for the period of time necessary to effect total cure. The sandwich of materials may suitably include, in succession, a textured sheet or blanket (e.g. fiberglass) that bears the decorative imprint to be embossed, a sheet of embossable material, e.g., Tedlar film having a nominal thickness of 1.5–2 mils, and a sheet of the uncured adhesive film. That layering can be repeated a number of times in the stack of materials to be pressed, with the adhesive film layers typically separated by a sheet of release paper or the like. This "sandwich" is then placed on the heated embossing press. The heat and pressure applied by the embossing press causes the adhesive film to adhere to the Tedlar sheet and to cure, and causes the pattern of the textured blanket to be imprinted into the laminate. Required conditions of such lamination and embossing have included pressures of about 100 psi and temperatures of about 320° F. for between 10 and 20 minutes.

The thus formed laminate with decorative patterned surface can be affixed to the interior surface of an aircraft, and formed into panels, side wall stowage bins, etc., typically by a vacuum-forming application, during which the formed decorative laminate can be exposed to temperatures of up to about 250° F. or more.

While that process can produce a suitable laminated product, the extended residence times of the layered sheets in the embossing press during lamination and embossing effectively limits throughput and adds substantially to manufacturing costs.

Other structural members which comprise laminates of various materials with thermosetting adhesives have also required high temperatures and dwell times, which effect the manufacture of the members. Moreover, unless the high curing temperatures and dwell times of the known thermosetting adhesive films are met in the processing, the structural integrity of the laminates produced can be severely adversely effected.

It thus would be desirable to have new compositions that could be used as an adhesive and as an embossing film.

It would be further desirable to provide such compositions which can be cured at lower temperatures and/or shorter times than current compositions. Such compositions would be highly useful in the fabrication of structural laminates, such as the decorative laminates for aircraft interiors.

SUMMARY OF THE INVENTION

The present invention provides novel low temperature curing adhesive film compositions which are particularly suitable for use as embossing compositions in the fabrication of structural members such as decorative laminates. The adhesive film compositions of the invention can be characterized in part as having the capability of being cured under more mild conditions and/or within shorter periods of time than prior adhesive film compositions.

The low temperature curing thermosetting adhesive compositions of the present invention are generally of two types: (1) reactive resins containing "blocked" isocyanates in which the blocking groups are leaving groups which leave the isocyanates at low temperatures, and/or (2) reactive isocyanates which are encapsulated in a non-reactive encapsulant, and thus can be released by shear, heat, pressure or solubility.

The compositions of the present invention can be used as (1) low temperature curing adhesives, for making structural bonds between laminate layers, or (2) as embossing compounds, which are formed on a film of material which is to be embossed, and which, in combination with the film itself, holds the embossed pattern in the film after the embossment process. The embossing compounds of the present invention are preferably applied to the film to be embossed prior to the embossing process, but can be applied simultaneously with the embossing of the film. Suitable films for embossment to form decorative laminates include polyvinyl fluoride, polyvinyl chloride, polyvinylidene chloride, polystyrene, and other polymers listed below.

The preferred low temperature curing thermosetting adhesive compositions generally comprise one or more reactive resins and a "blocked" isocyanate crosslinking agent, i.e., an isocyanate that is at least essentially or completely non-reactive with other composition components at temperatures below those required for curing of prior compositions. Preferred blocked isocyanate crosslinkers include those isocyanates blocked with thermally labile groups that can be activated at low temperatures. "Activation" of a blocked isocyanate refers to treatment of the blocked isocyanate to render it reactive with the resin component of the adhesive composition, e.g., heating to cleave or otherwise remove a thermally labile blocking group from the isocyanate.

Typically, curing is a temperature/time dependent phenomenon, with particular crosslinkers demonstrating little or no curing below a certain temperature ("minimum activation temperature"), and curing over decreasing amounts of time as the temperature goes up above that minimum. Prior cross linkers had a minimum activation temperature of about 270–290° F., and provided relatively slow rates of cure even at temperatures of 320–340° F.

Preferred cross linkers in accordance with the present invention, however, have minimum activation temperatures generally in the range of about 200–250° F., and which cure at relatively short time periods at temperatures with the range of between 240–300° F., with substantially immediate cure at the range of 320–350° F. Thus, whereas prior cross linkers, such as those disclosed in the Rossitto patent cited above, would require 10 to 20 minutes to cure at a temperature of about 320° F., the preferred adhesives of the present invention will cure completely within a few seconds at that temperature.

One way of measuring cure rate is to test the tensile strength of a film at the temperature of interest and over the time period of interest. The adhesive film samples of known thickness are tested for tenacity at temperature by use of a suitable tensile strength testing device, such as and Instron, with the jaws of the Instron being located in a controlled temperature environment. As the material cures, its tensile strength increases. Thus the "minimum activation temperature" for a given system can be determined by testing the adhesive of interest at various temperatures. Below the "minimum activation temperature," the curve of tensile strength versus time will be relatively flat. If the test is done above the minimum activation temperature, however, the curve of tensile strength versus time will have a positive slope, i.e., the tensile strength will increase over time at a given temperature until the adhesive system is completely cured. After that point, the tensile strength may remain the same over time or even decrease slightly, if continued treatment at the elevated temperature tends to degrade the cross-liked adhesive.

Preferred adhesive films of the present invention have a positive slope in the curve of tensile strength versus time at a temperature of 220° F. or less. More preferably, the strength versus time curve for 220° F. demonstrates a slope of at least about 40 psi/minute at a temperature of 220–250° F.

Preferred adhesive films of the present invention demonstrate a peak showing essential completion of curing within about 15 minutes at 240° F., preferably within about 11 minutes at about 260° F., most preferably within about 7–8 minutes at 280° F. to 300° F.

Moreover, the rate of crosslinking can be estimated by the time required to achieve a given level of tensile strength at a temperature of interest. Preferred crosslinking systems in accordance with the present invention attain a cure to the extent of achieving a tensile strength of at least about 2000 psi within 2 minutes at 240° F., and achieve a tensile strength of about 2000 psi within 4 minutes at about 220° F.

The invention also provides methods for the formation of structural members, such as decorative laminates. The present invention makes possible and practical, for the first time, the continuous manufacture of decorative laminates of the type described above, by laminating and embossing moving (non-stationary) sheets or webs of materials. Of course, methods for forming a decorative laminate by a batch-type process can also be employed utilizing the compositions of the present invention. In fact, the lower cure temperatures and shorter dwell times necessary for adequate lamination alone can provide savings in pressing of 30–50% compared to such processes with the prior materials. However, the use of the present invention in a continuous process of lamination and embossing, as made possible by the present invention, results in a savings in time, effort and expense which dwarfs the improvements obtained in the batch process.

The compositions of the invention are also useful as thermosetting heat sealable materials.

The methods of the present invention further provide for formation of a decorative laminate without prior casting of the adhesive composition onto release paper, thereby obviating waste problems of previous processes.

Still further, novel articles of manufacture are provided including substrates such as Tedlar coated with the adhesive compositions of the invention as well as extended (e.g., length of 10–20 feet or more) rolled sheets or webs of a decorative laminate that comprise the cured adhesive compositions of the invention. Other aspects of the invention are disclosed infra.

BRIEF DESCRIPTION OF THE DRAWING

The Figure depicts a schematic of a continuous embossing system of the invention.

DETAILED DESCRIPTION OF THE INVENTION

The preferred curing film adhesive compositions of the invention in general comprise 1) a blocked isocyanate crosslinking agent, and 2) one or more reactive resins that contain one or more functional groups, e.g. amine, hydroxyl or carboxy groups, that will react with an isocyanate group or otherwise undergo curing upon activation of the composition.

The reactive resins of the compositions of the invention are suitably a variety of materials including epoxies, and other polymers having available hydroxyl, carboxyl or amino groups, including polyurethanes, polyesters, polyethers, polyester polyethers, phenolics, epoxy novolacs, elastomers and acrylics having such functional groups. Hydroxy-terminated reactive polymers are generally preferred. The reactive resins preferably are soluble or at least dispersible in the composition solvent carrier such as methyl ethyl ketone, toluene, or glycol ethers, and, for hydroxyl-containing resins, have a hydroxyl number of about 1 to about 8 mg KOH/g.

Hydroxyl-containing polyurethanes are generally preferred reactive resins for purposes of the present invention and can be prepared by reaction of butane diol adipate, hexane diol adipate or polycaprolactone, preferably chain extended with methylene bisdiphenyi diisocyanate (MDI) or butane diol. These include commercially available products such as KJ Quinn PA-58 sold by K. J. Quinn, Melrose, Mass., Morton CA-100, CA-101, CA-128 or PA-500, sold by Morton Chemical, Chicago, Ill., and S943-34 sold by Bostik, Inc., Middleton, Mass. Other suitable resins include hydroxy terminated polyurethanes, such as Desmocoll 176, Desmocoll 400, Desmocoll 406, Desmocoll 510, Desmocoll 530 or Desmocoll 540, available from Mobay Chemical Corporation, Pittsburgh, Pa., or the following polymers available under the mark Irostic from Ironomer Chemie, West Germany: Irostic 120, 214N, 200, 214H, 157, 230, 210T, 212K, 300TN, 214K, 158C, 160/38, 159, 160/43, and/or 214T. Also useful is Morton PA 93–501 polycaprolactone, and the following Hydroxy Functional Acrylic polymers from Rhône-Poulenc: Poly-Tex™ 975, 9008, CMD 9015, CMD 9014, and CMD 9017.

Particularly preferred are the reaction product of the S943-34 polycaprolactone and MDI in stoichiometric proportions to produce a polyurethane having a hydroxyl number of from about 1 to about 8 mg KOH/g. This reaction is generally carried out at about 40% solids in a solvent such as toluene at about 100° C. The reaction is terminated when no NCO peaks are present, as determined by an infrared scan.

Another preferred reactive resin, particularly for use in combination with a hydroxyl-terminated polyurethane, is a phenoxy resin. Specifically preferred phenoxy resins include those hard, solid polymers made by reacting bisphenol A and epichlorohydrin and having the following general structure:

These products are commercially available, e.g. from Union Carbide Corporation, under the names Phenoxy PKHA, PKHH and PKHJ. PKHJ is particularly preferred. Phenoxy PKHJ is the highest molecular weight member of the phenoxy resin family and is available with molecular weights ranging from about 25,000 to about 35,000; and a Melt Index of about 3.5 to about 6.5. Phenoxy PKHJ is particularly preferred because it can produce a film that is easy to handle in the uncrosslinked state and imparts a high degree of toughness to the adhesive composition film layer.

A preferred reactive resin contains both a hydroxyl-terminated phenoxy resin (e.g., PKHJ) and a hydroxyl-terminated polyurethane resin (e.g. S943-34). The preferred weight ratio of the phenoxy resin to the polyurethane resin is from about 3:1 to about 1:2, with a range of about 1:1.5 to about 1:2 being preferred. Ratios outside of 3:1 to 1:2 can result in films which lack flexibility, e.g., are too brittle, and thus not suitable for embossing. Changing the ratio of the phenoxy resin and polyurethane resin within the above ranges will produce films of different flexibility, but still within the criteria for suitable embossing films. Generally, increasing the amount of a phenoxy resin results in the production of a more rigid film. Increasing the amount of a hydroxyl-terminated polyurethane generally results in the production of a softer film.

Other reactive resins suitable for use in the compositions of the invention can be prepared by known methods. For example, a suitable hydroxy-terminated polyester resin can be prepared by condensation of one or more polyhydric alcohol such as an alkyl diol and one or more polycarboxylic acids such as, e.g., adipic acid, azelaic acid, glutaric acid, succinic acid, sebacic acid, phthalic acid, isophthalic acid, terephthalic acid and other diacids as known to those skilled in the art of polymer synthesis. Suitable hydroxyl-terminated polyether resins may be prepared, e.g., by the reaction of one or more alkylene oxides with a polyhydric alcohol such as an alkyl diol.

Suitable epoxy resins are available from Shell Corporation under the trademark Epon: Epon 1001F, 1009F, 1002F, 1004F, and 1007F. Union Carbide manufactures the following suitable carboxylic acid functional vinyl resins: VMCH, VMCC, VMCA, and a suitable epoxy functional vinyl resin, VERR-40. Union Carbide also markets the following suitable hydroxyl functional vinyl resin: VROH; carboxylic functional vinyl resins: VAGH, VYES-Y, VAGD, VAGF, VAGC, VYNC, and VYES; and Phenoxy Resins: PKHJ.

The following suitable epoxy resins can be obtained from CIBA Geigy Plastics Division, Hawthorne, N.Y.: ECN-1235 (Epoxy Cresol Novolac), LT 8052 (brominated epoxy), LT 8049 (brominated epoxy), ECN-1273 (epoxy cresol novolac), MT-0163 (tetra-functional-phenol-based epoxy, ECN-1280, ECN-1282, XUGT 259, PT810, ECN-1299, ECN-9699, GT-6060, GT-9545, GT-7071, GT-7074, GT-9516, GT-7255, GT-7072, XU-243, XU-248, GT-7097, GT-7013, GT-6097, GT-9013, GT-7099, XB-4412, GT-6099, GF-7220, GT-7014, GT-9496, GT-7226, GT-6084, and XUGT-273.

The following suitable resins can be obtained from Schenectady Chemicals, Inc., Schenectady, N.Y.: FRJ-551

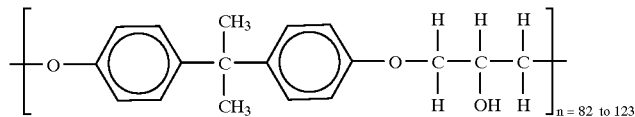

(Alkylphenolic Resin), SP-12 (Phenolic), SP-103 (Phenolic), SP-126 (Phenolic), SP-134 (Alkylphenolic), SP-144 (Alkylphenolic), SP-154 (Phenolic), SP-6600 (Phenolic), SP-6601 (Phenolic), SP-6700 (Novolak), SP-6701 (Novolak), CRJ-406 (O-Cresol-Formaldehyde Novolak), HRJ-2901 M-Cresol-Formaldehyde Novolak), HRJ-2355 (Butyphenol-Formaldehyde Novolak), CRJ-418 (Octyphenol-Formaldehyde Novolak), SP-1090 (Nonxylphenol-Formaldehyde Novolak), HRJ-11058 (Para-Dodecyl Phenol), SP-8014 (Phenol-Formaldehyde), SP-103 (Butylphenol-Formaldehyde), SP-12 (Alkyphenol-Formaldehyde), SP- 1045 (Octyphenol-Formaldehyde), HRJ-2366 (Epoxy Modified Phenol-Formaldehyde), HRJ-4411 (Epoxy Modified Phenol-Formaldehyde). The following suitable polyesters are available from Morton Chemical: 49000, 49001, 49002, 49029, and 49032.

The following suitable hydroxy terminated polyesters are available from Bostik, Inc., Middleton, Mass.: 7900, 7962, 7942, 7908, 7901, 7922, 7966, and 7973.

The isocyanate crosslinker component of the adhesive compositions of the invention is essentially non-reactive with other composition components at room temperature, but can be activated, e.g. by heating and/or pressure, to react with other composition components during use of the composition. That is, under lamination and/or embossing conditions, the isocyanate should be activated to react with the reactive resin(s) to provide the requisite embossing retention and substrate adhesion characteristics. Particularly preferred isocyanates include those that are blocked (i.e., rendered essentially non-reactive to other composition components) by means of a thermally labile moiety. For a continuous process for forming a decorative laminate, the isocyanate should be thermally activated at a temperature that enables lamination and embossing of a moving web or sheet. Specifically, the isocyanate should be activated and able to crosslink with other composition components upon exposure of a film layer of the composition (e.g., a dried layer thickness of from about 0.5 to 10 mils, more typically a dried layer thickness of about 2 to 5 mils) to a temperature of about 340° F. or less for about one second or less, more preferably exposure to a temperature of about 320° F. or less for about one second or less. By use of a moiety that is thermally liberated at such low temperatures, the blocking moiety can be removed under comparatively mild conditions and by a considerably shorter heating cycle than required to activate prior thermally labile isocyanate blocking groups.

Specifically preferred isocyanate agents that comprise thermally labile blocking groups include aliphatic isocyanate prepolymers. These materials are suitably either difunctional or trifunctional isocyanates. Specifically preferred thermally-activated isocyanate prepolymers include a polyisocyanate blocked with a malonic acid ester group, particularly an malonic acid alkyl ester such as a malonic acid di-alkylester, preferably where the alkyl ester groups have from 1 to about 8 carbon atoms or 1 to about 4 carbon atoms, such as a malonic acid dimethylester, malonic acid diethylester, etc., or mixed alkyl diesters such as mixed $C_{1-4}$ alkyl diesters.

A preferred group of blocked isocyanates for use in the compositions of the invention are represented by the following formula I:

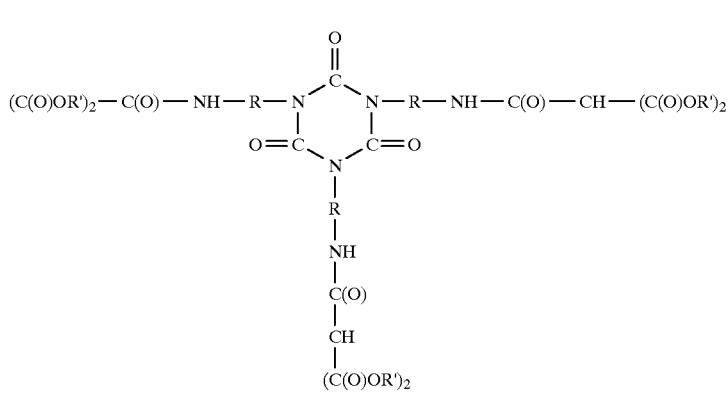

wherein each R group is independently a $C_{2-10}$ alkylene, and each R' is independently a $C_{1-8}$ alkyl, preferably $C_{1-4}$ alkyl.

A specifically preferred blocked isocyanate is the blocked hexamethylene triisocyanate based adduct sold under the name of XP7012 by Mobay Chemical, Pittsburgh, Pa. and having the following structure:

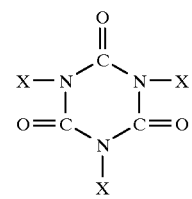

wherein each X group is—$(CH_2)_6$—NH—C(O)—CH—(C(O)OCH$_2$CH$_3$)$_2$.

Other low temperature curing blocked polyisocyanates include Desmodur KL5-23711 and Desmodur LS-2759, also both available from Mobay.

Alternatively, instead of a blocked isocyanate which has thermally labile blocking groups, the non-reactive isocyanate component in the uncured resin can comprise encapsulated active isocyanates, which are prevented from reaction under normal conditions by their encapsulation. Encapsulated isocyanates may be employed as the blocked crosslinker of the present composition. However, for at least some applications, encapsulated isocyanates may be less preferred than an isocyanate blocked with a thermally labile blocking group.

Protected isocyanates are microencapsulated with a protective shell and thereby are not available for reaction with the reactive resin(s) of the composition during storage at room temperature and prior to use. Such a material suitably has a polyurea shell that encapsulates a nucleus of reactive isocyanate. Upon heating of and/or applying pressure to the material, the shell becomes permeable thereby liberating the encased reactive isocyanate. The material may be formed, e.g., by contacting an aggregation of the isocyanate with water. The isocyanate that contacts water will crosslink and form the polyurea shell that encases the isocyanate within the aggregation. The polyurea shell prevents reaction of the encased isocyanate with the surrounding water or other reactive materials. Such encased isocyanates are commercially available, e.g., the product sold under the trade name Baycoll VP KA 8578 by Mobay Chemical.

Further possibilities include use of an inert gelatin shell over the surface of an isocyanate nucleus. Whatever the encapsulating means, the encasing shell should have limited solubility in the encased isocyanate and other components of the adhesive composition. Additionally, there should be at least essentially no leakage of the encased crosslinker prior to intended heat and/or pressure activation. Further, the encapsulating shell should be rendered permeable at relatively low temperatures, e.g. heating for one to three seconds to a temperature of less than about 250° F., more preferably less than about 220° F. Alternatively, the shell should be rendered permeable at pressures used to form a decorative laminate by the processes disclosed herein, e.g., the inert shell should be rendered permeable at pressures of about 500 psi or less, preferably from about 100 to 150 psi.

Aliphatic isocyanates are preferably used in the compositions of the invention due to their light stability relative to aromatic isocyanates. Similarly, if an isocyanate with a thermally labile blocking group is employed, phenol or other aromatic blocking groups are generally less preferred, due to the potential color such highly conjugated moieties can impart to the adhesive composition.

Embossing compositions of the present invention are preferably used with a structural film to be embossed, and, upon embossing, act with such films to hold the embossed pattern in the films. Preferred structural films for use in making decorative laminates in accordance with the present invention include polyvinyl fluoride, such as Tedlar® from DuPont, polyvinyl chloride, such as American Hoechst VCA 3347, and polyvinylidene chloride, such as Dow Chemical's Saranex 15. Other suitable embossible film materials include acrylates (e.g., Korad®, from Korad, Inc.), cellulose acetate butyrate (e.g., UVEX, from Eastman Chemicals), cellulose butyrate, cellulose propionate, chlorinated polyethylene, chloroprene, ethylene ethylacrylate (e.g., PE-79 from Pierson Industries), ethylene vinyl acetate, (e.g., EV-1200, from Favorite Plastic Co.), ionomer (e.g., CT-IO-30 from CT Films), isobutylene (e.g., Sur-flex SF87 from Flex-O-Glass, Inc.), nitro cellulose, (e.g., Olin CP-11-20, from Olin), nylon (e.g., Nylon 6, from Allied Chemical Corporation), polyacrilonitrile, (e.g. Bemberg PAN, from Bemberg Folien), polyamide (e.g. TX-4 from TME-Corp.), polybutylene (e.g., Flex-O-Film Butlene, from Flex-O-Glass, Inc.), polybutyrate (e.g., Flex-O-Film Butyrate, from Flex-O-Glass, Inc.), polyester (e.g. Mylar S, from DuPont), polyethylene, (e.g., Extrel, from Exxon Chemical Co.), polyethylene EVA (e.g., PE-74, Pierson Industries), polyimide (e.g. Kapton, DuPont), polypropylene, (e.g. Trycite 5000, Dow Chemical), polyurethane (e.g. Deefield PS 1010, Deerfield Plastics), acrylonitrile-butadiene-styrene (ABS) copolymers, such as Royalite R54, from Uniroyal Corp.), and styrene-butadiene copolymers.

A fire retardant agent or system is an optional but particularly preferred additional component of the adhesive compositions of the invention. A preferred fire retardant composition comprises antimony trioxide, a halogenated material such as decabromodiphenylene oxide, and a intumescent filler such as aluminum trihydrate. Other oxides of antimony and tin, magnesium and iron also may be used and may be preferred for some applications. Similarly other halogenated compounds will be suitable or even preferred such as dechlorane (perchloropentacyclodecane, available from Occidental under the name DEC PLUS, such as DEC PLUS 25 grade). Other halogenated compounds can be used such as brominated diphenylene oxides. Other suitable intumescent fillers include zinc borate and magnesium hydroxide.

The preferred antimony trioxide used in the fire retardant component have an average particle size of less than approximately 10 microns so that it forms a dispersion in a suitable solvent such as toluene, methyl ethyl ketone or a glycol ether. Suitable antimony trioxides include Amspec KR, having an average particle size of 1.1 micron and sold by Amspec Chemical Co.; and Thermoguard S, having an average particle size of 1.5 micron, sold by Metal & Thermit (M & T). Preferred is Thermoguard S. The preferred decabromodiphenylene oxide employed in the fire retardant compositions have an average particle size of less than approximately 10 microns so that it will form a dispersion in a suitable solvent such as toluene, methyl ethyl ketone or a glycol ether. Suitable decabromodiphenylene oxides include Saytec 102 from Ethyl Corporation and DE83R from Great Lakes Chemical, having an average particle size of approximately 5 microns, and more than 90% of the particles having a particle size less than 10 microns. DE83R is generally preferred. A preferred flame retardant system is disclosed in U.S. Pat. No. 4,788,091 to Rossitto et al., incorporated herein by reference.

A particularly preferred fire retardant component for use in the compositions of the invention is free of compounds of Br and antimony. A specifically preferred component comprises stannic oxide, dechlorane (perchloropentacyclodecane) and aluminum trihydrate. See Example 2 which follows.

The adhesive compositions also may contain other optional additives. For example, the adhesive composition may suitably comprise other polymers and surfactants to enhance film forming and other rheological properties of the adhesive composition, or pigments, dies, fillers, deglossers, plasticizers etc.

To enable good adhesion of a coating layer of an adhesive composition on a substrate such as Tedlar, a dried uncured coating layer of an adhesive composition of the invention should soften at temperatures within a range of from about 180° F. to 280° F., more preferably from about 200° F. to 260° F.

To enable application of a formed decorative laminate to an aircraft interior such as by a vacuum-forming process, the cured adhesive coating layer of the formed decorative laminate should have a softening temperature of about 250° F. or greater, more preferably a softening point of about 300° F. or greater. Compositions that have softening points below these temperatures can be unsuitable as the image embossed in the decorative laminate can degrade upon exposure to the elevated temperatures attendant to a vacuum-forming application process. As used herein, the term "softening point" of a composition layer refers to the temperature at which a composition coating layer first shows (by observation) signs of tackiness or flow.

The adhesive film compositions of the invention are suitably formulated as liquid coating compositions by admixing the reactive resin and isocyanate components in a suitable solvent, e.g., methyl ethyl ketone, toluene and glycol ethers such as methoxy acetoxy propane, sold under the tradename Dowanol PM by Dow Chemical, Midland, Mich. Solutions are suitably formed with approximately 25 to 40 percent solids by weight and having a solution viscosity of approximately 2000 to 7000 cPS.

The isocyanate component may be admixed directly with the reactive resin component. It is preferred that the isocyanate component be added just prior to the formation of the adhesive layer. and prior application of the adhesive composition onto a substrate.

To form a composition of the invention, a dispersion of the flame retardant agents in a solvent Is suitably produced separately from a solution of the reactive resin component. Suitable solvents for the flame retardant include toluene, methyl ethyl ketone and glycol ethers such as methoxy acetoxy propane sold under the tradename Dowanol PM.

After the solution of the reactive resin and solution of flame retardants have been formed, the solutions should be mixed together in the amounts to form a final film composition of about 30 to about 85 weight percent flame retardant. The preferred film composition has from about 50 to about 85 weight percent flame retardant agent.

The combined solutions are mixed well to produce a solution with approximately 40 to 50% by weight solids and a viscosity of about 3000 to about 6000 cPS, although suitable viscosities can vary depending on the particular method employed for coating the composition onto a substrate, as will be apparent to those skilled in this art. The isocyanate component is added to this combined solution in an amount to result in approximately 2 to 7 weight percent of the final film composition with about 2½ to 6 weight percent preferred.

The combined solution with the additional additives, if any, can be cast directly onto the support layer such as Tedlar using suitable coating equipment as is known in the art. Casting the adhesive composition onto release paper may be done but is not necessary, particularly for a continuous embossing/lamination process. A suitable thickness of the applied wet film layer is about 3 mils. If coated onto release paper, the wet film coating is then dried continuously in an oven at temperatures less than 200° F. for about 5 to 20 minutes in order to remove volatile solvents. Care should be taken to dry the film at the lowest temperature possible and for the shortest time to prevent unblocking of the isocyanate component. It is understood that the adhesive film layer is in the uncrosslinked state after this pre-cure heat treatment step.

The compositions of the invention may be used in general accordance with prior batch-type lamination processes such as disclosed in the above incorporated U.S. Pat. No. 4,788,091, although residence times within the embossing press will be substantially reduced. Specifically, if the adhesive composition has been coated onto release paper, the adhesive film is stripped from the release paper and placed on a layer of Tedlar within a heated embossing press. Suitable embossing conditions include pressures of about 100–500 psi and temperatures of approximately 230 to about 320° F. for about 4 or 5 minutes or less, more preferably for a matter of seconds. Lower temperatures and cure times are preferred, provided that the material can be dried at reasonable temperatures without effectively post treating the film in the drying oven. The residence times within the embossing press are significantly shorter than residence times employed with prior compositions and can provide significantly increased throughput. Under these conditions (i.e., 220° F.±10° for ca. 4–5 minutes or less), the blocked isocyanates become unblocked and crosslink with the resin binder and/or hydroxyl-containing components of the composition. The adhesive film thus adheres to the substrate and accepts and holds the patterns imparted during embossing. Also, the film may be utilized to form materials having two or more layers of Tedlar.

The adhesive compositions of the invention can be employed in a continuous lamination and embossing process for formation of a decorative laminate. The phrase continuous process or method for formation of a decorative laminate as used herein refers to a process for both lamination and embossing moving (i.e., non-stationary) sheets or webs of materials and wherein the laminated and embossed material is suitable for use as a decorative laminate in the fabrication of passenger aircraft interiors. It has been found that the above specified temperatures of thermal activation of the compositions of the invention are critical to enable use of the composition in a continuous lamination and embossing process. That is, it has been found that an adhesive composition is not suitable for a continuous lamination and embossing manufacturing method of a decorative laminate where the composition is activated (i.e. the isocyanate deblocked) only at temperatures greater than about 350° F. in the continuous cycle because such temperatures can degrade the polyvinylfluoride substrate or other material used to form the decorative laminate.

A suitable continuous process embossing and lamination can be suitably conducted by passing a support film such as a Tedlar sheet or web with a layer of an adhesive composition of the invention coated thereon through a heated nip to effect lamination and embossing of the materials. Suitably an adhesive composition of the invention is cast directly (i.e., without the use of release paper) onto a web or sheet of the support film. The coated web or sheet is preferably dried at this time (e.g., by hot air blowers or other heating means) at temperatures sufficient to remove solvent and provide a tack-free coating layer, but without causing significant reaction of the adhesive composition components or the coating layer adhering to nip rolls employed later in the process. The coated web or sheet with dried adhesive layer then can be advanced continuously through a lamination and texturing system, e.g. by a plurality of rollers or by other transport means. To form a "double" decorative laminate as is sometimes employed in passenger aircraft interiors, a second sheet or web of support film such as Tedlar can be applied on top of the adhesive layer of the coated web or sheet at this time. For fabrication of a "single" decorative laminate, the coated sheet or web is advanced through the lamination and embossing system without application of such an additional layer of support film.

The coated support web or sheet can be embossed by a laminating and embossing nip, e.g., a nip composed of two rollers wherein at least one roller is heated to a temperature sufficient to deblock the crosslinking agent. For example, a roller heated to about 300–350° F. or greater should be sufficient to effect lamination and embossing. One of the rolls of the nip also should contain a raised pattern of the image to be transferred to the coated support film. Application of the embossing roller to the coated support film under conditions of pressure and elevated temperatures transfers that textured pattern to the coated support film. The rolls of the nip are suitably of steel construction, with the non-patterned roll optionally coated with rubber or with a nonstick material such as Teflon to avoid adherence of the adhesive film layer during the lamination and embossing process. The nip rolls are maintained at a temperature suitable to impart to the film for activation. The size, temperature, and effective area of contact of the nip rollers with the film can be adjusted to impart the desired temperature and dwell time to the support and adhesive films. After lamination and embossing, the coated sheet can subjected to a post-embossing cure bake to complete the cure of the adhesive composition. After such a post-cure bake, embossed and laminated film can be suitably wound as a roll which facilitates storage and later use of the decorative laminate.

Suitable embossing conditions might include a steel embossing roll, bearing the pattern to be impressed into the laminate, and a rubber covered nip roll, the rolls being so located that the film/adhesive contact the rolls for about half to about three quarters of their circumference or more. One of the nip rolls, e.g. the backing roll, can be used as primary heat source for the support/adhesive composite, e.g., being heated to a temperature of about 300° F., while the embossing roll is heated to only about 60° F. In such a case the composite film would first contact the backing roll, receive heat from that roll as it traverses three quarters of the circumference of that roll, and then be subjected to heat and pressure to cure into the embossed film having the surface configuration imparted by embossing roll.

The Figure of the Drawing depicts a suitable continuous embossing and laminating system 10 of the invention wherein a support layer 12 such as a Tedlar sheet is unwound from spool 14, passes over rollers 16 and 16' and is then covered or "mated" with a coated layer 18. Layer 18 is suitably a Tedlar sheet or other support layer that is coated on one surface with a layer of an adhesive composition of the invention. Layer 18 is unwound from spool 14, passes over rollers 22 and 22' and then the adhesive coated face of that layer contacts or mates with layer 12 at the lower roller 22. The thus formed "sandwich" of layers 24, consisting of layers 12 and 18, then passes through nip 26 that includes embossing roll 28 and backing roll 30. Embossing roll 28 suitably has a relief image of the pattern to be printed into the layers 24 and is heated as discussed above. The layers 24 may be preheated prior to contacting nip 26 such as by hot air blowers or other suitable heating means, and the embossed and laminated film material 32 produced by nip 26 can be further heated after passing through the nip to complete the cure of reactive components of the adhesive composition. For example, film material 32 can pass through a curing oven or other heating means prior to use or storage. The embossed film material may be used directly after such processing or it may be stored for later use such as a wound roll 34. Layers 12, 18 and 24 and embossed film material 32 may be transported through system 10 by any of a number of suitable transport means such as a belt driven system wherein one or more moving belts contact the layers and film material to move the same through the system.

The curing adhesive compositions of the invention can also be useful as a thermosetting heat seal between two or more substrates, such as layers of film, e.g. as a polypropylene, polyacrylonitrile, polyethylene, mylar, acrylic, non-wovens such as Dacron, polycarbonates, etc., as well as foils such as a Cu or aluminum foil. Layers of papers and fabrics also can be sealed with compositions of the invention. For such applications, the composition is applied to a film thickness of about 0.1 to 1.0 mils, more typically about 0.2 to 0.4 mil thickness, on a support layer formed from materials noted above or others known in the art, and then a second layer is applied over the adhesive coating layer. When it is desired to seal the layers, heat is applied such as by a press, iron or other known heat sealing means.

The following non-limiting examples are illustrative of the invention.

EXAMPLE 1

A preferred curing adhesive composition of the invention contains in admixture the following components with amounts expressed as parts by weight:

| Components | Amounts |
| --- | --- |
| Resins | |
| Polyurethane Resin (S943-34) | 27.00 |
| Phenoxy Resin (PKHJ) | 31.41 |
| Blocked Isocyanate (Desmodur XP7012) | 9.83 |
| Fire Retardant Agent | |
| Antimony Trioxide | 23.79 |
| Decabromodiphenylene oxide | 39.66 |
| Aluminum Trihydrate | 59.33 |
| Solvent | 465.9 |
| Dowanol PM | 119.6 |
| Toluene | 268.2 |
| Methyl Ethyl Ketone | 78.1 |

In the above composition, in the resin component, the polyurethane is a hydroxyl-terminated polyurethane having a weight average molecular weight of about 125,000, and the phenoxy is the hydroxy-terminated phenoxy resin identified above and sold under the trade name of Phenoxy PKHJ. The blocked isocyanate is XP7012 (Mobay) as identified above. The antimony trioxide is Thermoguard S and the aluminum trihydrate was Aluchem AC714K.

Preferred embossment conditions for this system are as follows: Nip temperature 320–350° F., with the films being brought to that temperature prior to the nip, and maintained at that temperature for 5–10 seconds after the nip. Then nip roll pressure should be about 280 to 320 psi. The dwell times and pressures may vary somewhat depending on the particular films being run and the depth of the embossment pattern being used.

EXAMPLE 2

Another preferred curing adhesive composition of the invention contains in admixture the following components with amounts expressed as parts by weight:

| Components | Amounts |
| --- | --- |
| Resins | |
| Polyurethane Resin | 47.86 |
| Phenoxy Resin | 55.8 |
| Blocked Isocyanate | 17.5 |
| Fire Retardant Agent | |
| Aluminum Trihydrate | 105.5 |
| Stannic Oxide | 21.2 |
| Dechlorane | 91.7 |
| Solvent | |
| Dowanol PM | 118.2 |
| Toluene | 230.7 |
| Methyl Ethyl Ketone | 76.8 |

In the above composition, the polyurethane resin, phenoxy resin and blocked isocyanate are the same as identified above in Example 1.

EXAMPLE 3

Another preferred curing adhesive composition of the invention contains in admixture the following components with amounts expressed as parts by weight:

| Components | Amounts |
|---|---|
| Resins | |
| Polyurethane Resin | 36.35 |
| Epoxy Resin | 12.53 |
| Blocked Isocyanate | 8.2 |
| Fire Retardant Agent | |
| Antimony Trioxide | 6.25 |
| Decabromodiphenyloxide | 18.75 |
| Solvent | |
| Acetone | 28.44 |
| Toluene | 29.87 |
| Methyl Ethyl Ketone | 121.08 |
| Isopropanol | 2.18 |

In the above composition, the epoxy resin is the material sold under the trade name EPON 1001F by Shell. The polyurethane resin and blocked isocyanate are the same materials as identified in Example 1 above.

EXAMPLE 4

Another preferred curing adhesive composition of the invention contains in admixture the following components with amounts expressed as parts by weight:

| Components | Amounts |
|---|---|
| Resins | |
| Bostik 7962 Polyester Resin | 11.3 |
| Bostik 7376 Polyurethane Resin | 42.8 |
| Blocked Isocyanate (XP-7012) | 5.0 |
| Fire Retardant Agent | |
| H-LSR Antimony Trioxide | 4.8 |
| Decabromodiphenyloxide (Great Lakes DE-83R) | 14.5 |
| Solvent | |
| Toluene | 22.0 |
| Methyl Ethyl Ketone | 38.2 |

EXAMPLE 5

Another preferred curing adhesive composition of the invention contains in admixture the following components with amounts expressed as parts by weight:

| Components | Amounts |
|---|---|
| Resins | |
| VMCH Vinyl Resin (UCC) | 100 |
| col 176 Urethane | 60 |
| Dow Corning 4-7051 Silicone Powder | 8 |
| Encapsulated Isocyanate | |
| Bacoll VP KA 8578 (Mobay) | 30 |
| Fire Retardant Agent | |
| Aluminum Trihydrate | 40 |
| Dechlorane Plus | 32 |
| $Mg(OH)_2$ | 4 |

| Components | Amounts |
|---|---|
| Solvent | |
| Toluene | 100 |
| Methyl Ethyl Ketone | 268 |

EXAMPLE 6

Another curing adhesive and embossing composition of the present invention contains in admixture the following components with amounts expressed as parts by weight:

| Components | Amounts |
|---|---|
| Resins | |
| CIBA Geigy Epoxy GT-7071 | 43.5 |
| CIBA Geigy Araldite 6010 | 5.4 |
| Carboxylated SBR (Nyapol 1472) | 10.0 |
| Encapsulated Isocyanate | |
| XP-7012 | 8.0 |
| Fire Retardant Agent | |
| Columbian Iron Oxide (Yellow) | 7.0 |
| Zinc Borate 415 (US Borax) | 5.0 |
| Dec Plus 25 (Occidental) | 15.0 |
| Solvent | |
| Toluene | 30.0 |
| Methyl Ethyl Ketone | 42.0 |

EXAMPLE 7

Another curing adhesive and embossing composition of the present invention contains in admixture the following components with amounts expressed as parts by weight based on the total weight of the composition:

| Components | Amounts |
|---|---|
| Resins | |
| Bostic Polyamide 7239 | 50 |
| Shell Epoxy 1002 | 44 |
| Encapsulated Isocyanate | |
| XP-7012 | 12 |
| Fire Retardant Agent | |
| Antimony Trioxide (M&T Thermoguard S) | 9 |
| Decabromodiphenyloxide (Great Lakes DE-83R) | 27 |
| Solvent | |
| Toluene | 200 |
| Isopropanol | 200 |

The foregoing description of the invention is merely illustrative thereof, and it is understood that variations and modifications can be made without departing from the scope or spirit of the invention as set forth in the following claims.

What is claimed is:

1. A decorative laminate, comprising:
   a film of embossing compound comprising at least one reactive resin and an isocyanate, wherein the isocyanate can be activated by exposure to a temperature of about 220° F., and
   an embossable film,
   said embossing compound being suitable when cured to hold an embossed pattern in the embossable film at temperatures of at least 250° F.

2. The decorative laminate of claim 1, wherein the isocyanate is selected from the group consisting of blocked isocyantes having at least one thermally labile blocking group, and encapsulated isocyanates.

3. The decorative laminate of claim 2 wherein the blocked isocyanate has the following formula:

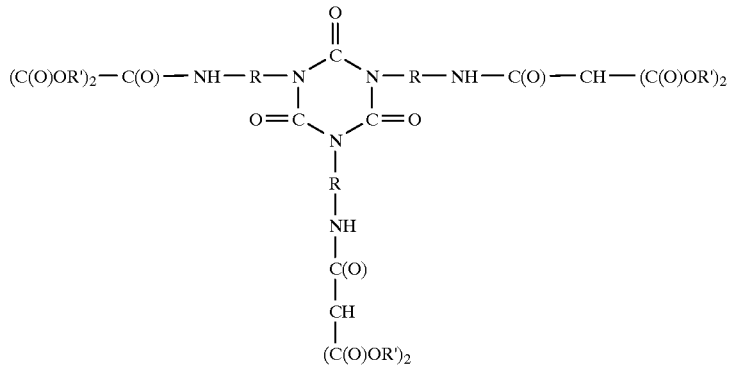

wherein each R group is independently alkylene having from 2 to about 10 carbon atoms, and each R' is independently alkyl having from 1 to about 8 carbon atoms.

4. The decorative laminate of claim 2 wherein the fire retardant agent comprises stannic oxide and perchloropentacyclodecane.

5. The decorative laminate of claim 2, wherein the blocked isocyanate has the structure:

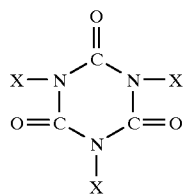

wherein each X group is —(CH$_2$)$_6$—NH—C(O)—CH—(C(O)OCH$_2$CH$_3$)$_2$.

6. The decorative laminate of claim 1, wherein the reactive resin comprises a hydroxy functional resin, a carboxyl-functional resin an epoxy resin, or an amino-functional resin.

7. The decorative laminate of claim 1, wherein the reactive resin comprises a hydroxy-terminated polyurethane, a phenoxy resin, a hydroxy-terminated polyester, a hydroxy-terminated polyether, a hydroxy-terminated polyester polyether, a hydroxy-terminated phenoxy resin, a hydroxy-terminated epoxy resin, or a hydroxy-terminated epoxy novolac resin or a hydroxy-terminated acrylic resin.

8. The decorative laminate of claim 1, further comprising a fire retardant agent.

9. The decorative laminate of claim 1, in the form of a continuous rolled web.

10. The decorative laminate of claim 1, wherein the embossing compound exhibits a tensile strength versus time curve having a slope of at least about 40 psi/minute at a temperature of about 220° F.

11. The decorative laminate of claim 1, wherein the embossing film is laminated to the embossable film.

12. The decorative laminate of claim 1, wherein the isocyanate is an aliphatic isocyanate and comprises a thermally labile blocking group.

13. The decorative laminate of claim 1, wherein the embossing compound achieves a tensile strength of at least about 2000 psi within 4 minutes of heating at about 220° F.

* * * * *